United States Patent [19]

Yoshinaka et al.

[11] Patent Number: 5,006,098
[45] Date of Patent: Apr. 9, 1991

[54] POWER TRANSFER MECHANISM FOR MOTOR VEHICLE

[75] Inventors: Toshio Yoshinaka, Nagoya; Hideo Hamano; Hiroshi Minami, both of Toyota; Shinji Ogawa, Toyota, all of Japan

[73] Assignee: Toyota Jidosha Kabushiki Kaisha, Toyota, Japan

[21] Appl. No.: 480,144

[22] Filed: Feb. 14, 1990

[30] Foreign Application Priority Data

Feb. 14, 1989 [JP] Japan .................... 1-34685

[51] Int. Cl.⁵ .......................................... B60K 17/348
[52] U.S. Cl. ...................................... 475/86; 475/252; 180/247; 180/248; 74/665 T
[58] Field of Search .............. 180/248, 249, 247; 74/665 T; 475/248, 249, 84, 86, 221, 252, 205

[56] References Cited

U.S. PATENT DOCUMENTS

| | | | |
|---|---|---|---|
| 4,103,753 | 8/1978 | Holdeman | 180/247 |
| 4,476,952 | 10/1984 | Suzuki | 180/247 |
| 4,711,136 | 12/1987 | Yoshinaka et al. | 180/247 |
| 4,718,303 | 1/1988 | Fogelberg | 180/249 |
| 4,763,749 | 8/1988 | Miura et al. | 475/205 |
| 4,788,886 | 12/1988 | Nussbaumer et al. | 74/665 T |
| 4,890,509 | 1/1990 | Hara | 475/86 |

FOREIGN PATENT DOCUMENTS 61-200729 12/1986 Japan .
63-46231 3/1988 Japan .
63-36969 7/1988 Japan .

Primary Examiner—Charles A. Marmor
Assistant Examiner—A. M. Boehler
Attorney, Agent, or Firm—Oblon, Spivak, McClelland, Maier & Neustadt

[57] ABSTRACT

In a power transfer mechanism including an input shaft arranged to be applied with drive torque from a prime mover of a motor vehicle, a first output shaft arranged coaxially with the input shaft for drive connection to a first set of drive axles and a second output shaft arranged in parallel with the first output shaft for drive connection to a second set of drive axles, a planetary gearset of the double pinion type is mounted on the first output shaft to transfer the drive torque from the input shaft to the first and second output shafts, the planetary gearset including a ring gear in drive connection to the input shaft, a sun gear in drive connection to the first output shaft and a planet carrier for drive connection to the second output shaft, a limited-slip differential in the form of a viscous fluid coupling is disposed between the ring gear and planet carrier to limit differential action between the first and second output shafts, and a drive train for drive connection between the planet carrier and the second output shaft is located at the rear side of the viscous fluid coupling.

6 Claims, 2 Drawing Sheets

POWER TRANSFER MECHANISM FOR MOTOR VEHICLE

BACKGROUND OF THE INVENTION

1. Field of the Invention

The present invention relates to a power transfer mechanism for motor vehicles, more particularly to a power transfer mechanism adapted for use in combination with a power transmission of a four-wheel drive vehicle to transfer drive torque from the power transmission to a set of front-wheel drive axles and/or a set of rear-wheel drive axles.

2. Description of the Prior Art

Disclosed in Japanese Laid-open Utility Model Applications Nos. 61-200729 and 63-46231 is a power transfer mechanism of the type which includes an input shaft arranged to be applied with drive torque from a prime mover, a first output shaft arranged coaxially with the input shaft for drive connection to a set of rear-wheel drive axles, an intermediate hollow shaft in surrounding relationship with the input shaft, a second output shaft arranged in parallel with the hollow shaft for drive connection to a set of front-wheel drive axles, a planetary gearset mounted on the hollow shaft to transfer drive torque from the input shaft to the first and second output shafts, and a limited-slip differential arranged between the hollow shaft and the first output shaft to limit differential operation of the output shafts.

In such a power transfer mechanism as described above, the planetary gearset is of the single pinion type wherein the planet carrier is adapted as an input element in drive connection to the input shaft, the ring gear as a first output element in drive connection to the first output shaft, and the sun gear as a second output element in drive connection to the intermediate hollow shaft. The limited-slip differential is in the form of a viscous fluid coupling in drive connection to the first and second output elements of the planetary gearset. A drive train between the intermediate hollow shaft and the second output shaft is located at the front side of the planetary gearset and viscous fluid coupling.

In the above arrangement, the differential operation between the output shafts directly acts on the viscous fluid coupling, causing excessive wear of the components thereof. Assuming that the drive train between the intermediate hollow shaft and the second output shaft is located at the rear side of the limited-slip differential, the planet carrier is adapted as a first output element and the sun gear as a second output element. In such a case, the transfer ratio of drive torque to the rear-wheel drive axles through the first output element may not be increased since the ring gear acts as an input element.

SUMMARY OF THE INVENTION

It is, therefore, a prime object of the present invention to provide an improved power transfer mechanism wherein a planetary gearset of the double pinion type is adapted to avoid excessive wear of the components of a limited-slip differential associated thereto and to increase the transfer ratio of drive torque to the rear-wheel drive axles.

According to the present invention, there is provided a power transfer mechanism adapted for use in a motor vehicle, which comprises a casing structure, an input shaft rotatably mounted within the casing structure to be applied with drive torque from a prime mover of the vehicle, a first output shaft arranged coaxially with the input shaft and rotatably mounted within the casing structure for drive connection to a first set of drive axles, a second output shaft arranged in parallel with the first output shaft and rotatably mounted within the casing structure for drive connection to a second set of drive axles, a planetary gearset of the double pinion type mounted on the first output shaft to transfer the drive torque from the input shaft to the first and second output shafts, the planetary gearset including a ring gear in drive connection to the input shaft, a sun gear in drive connection to the first output shaft and a planet carrier for drive connection to the second output shaft, a limited-slip differential disposed between the ring gear and planet carrier of the planetary gearset to limit differential action between the first and second output shafts, and a drive train for providing drive connection between the planet carrier and the second output shaft.

In a practical embodiment of the present invention, the planet carrier is mounted on an intermediate hollow shaft in surrounding relationship with the first output shaft for rotation therewith, and the limited-slip differential is in the form of a viscous fluid coupling mounted on the intermediate hollow shaft, the fluid coupling including an outer casing coupled with the ring gear of the planetary gearset, an inner member mounted on the intermediate hollow shaft and coupled within the outer casing for relative rotation, a first set of annular plates axially slidably coupled with the inner member for rotation therewith, and a second set of annular plates axially slidably coupled with the outer casing for rotation therewith and being interleaved with the first set of annular plates. In this arrangement, the drive train for drive connection between the planet carrier and the second output shaft includes a drive member mounted on the intermediate hollow shaft at the rear side of the viscous fluid coupling for rotation therewith, and a driven member rotatably mounted on the second output shaft in a common vertical plane with the drive member to be selectively connected to the second output shaft and being drivingly connected to the drive member.

In the power transfer mechanism, it is to be noted that the limited-slip differential in the form of the viscous fluid coupling is disposed between the ring gear and planet carrier of the planetary gearset. With such an arrangement, the half of differential rotation between the first and second sets of drive axles acts on the viscous fluid coupling to cause relative rotation between the interleaved annular plates. This is effective to avoid excessive wear of the components of the viscous fluid coupling. Since the sun gear is adapted as the output element in drive connection to the first output shaft and the planet carrier as the output element in drive connection to the second output shaft, the transfer ratio of drive torque between the sun gear and the planet carrier can be determined as follows:

$$Tc:Ts = (1 - Ns/Nr):Ns/Nr$$

where Tc and Ts each represent drive torque applied to the planet carrier and the sun gear, and Ns and Nr each represent the number of teeth of the sun gear and the ring gear. Since a plurality of planet pinions are interposed between the sun gear and the ring gear, the ratio of Ns/Nr can be determined to be 0.3–0.7, and the transfer ratio Tc:Ts of drive torque can be determined to be (0.7–0.3):(0.3–0.7). Thus, the transfer ratio of drive torque to the first set of drive axles can be determined to be larger than that of drive torque to the second set of drive axles.

BRIEF DESCRIPTION OF THE DRAWINGS

Additional objects, features and advantages of the present invention will be more readily appreciated from the following detailed description of a preferred embodiment when taken in connection with the accompanying drawings, in which.

DESCRIPTION OF THE PREFERRED EMBODIMENT

Figure 1:
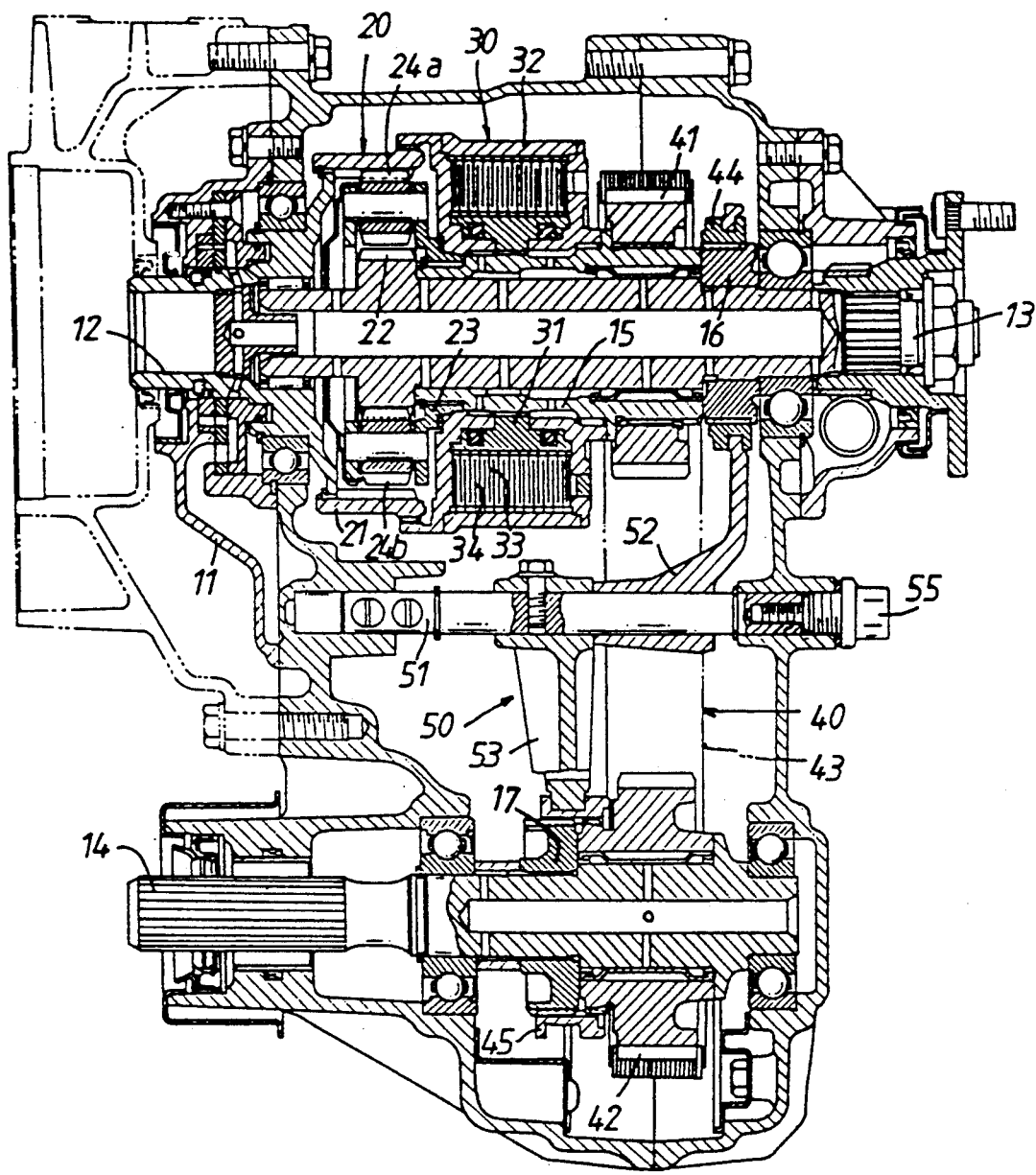
FIG. 1 is a full sectional view of a power transfer mechanism in accordance with the present invention.
Figure 2:
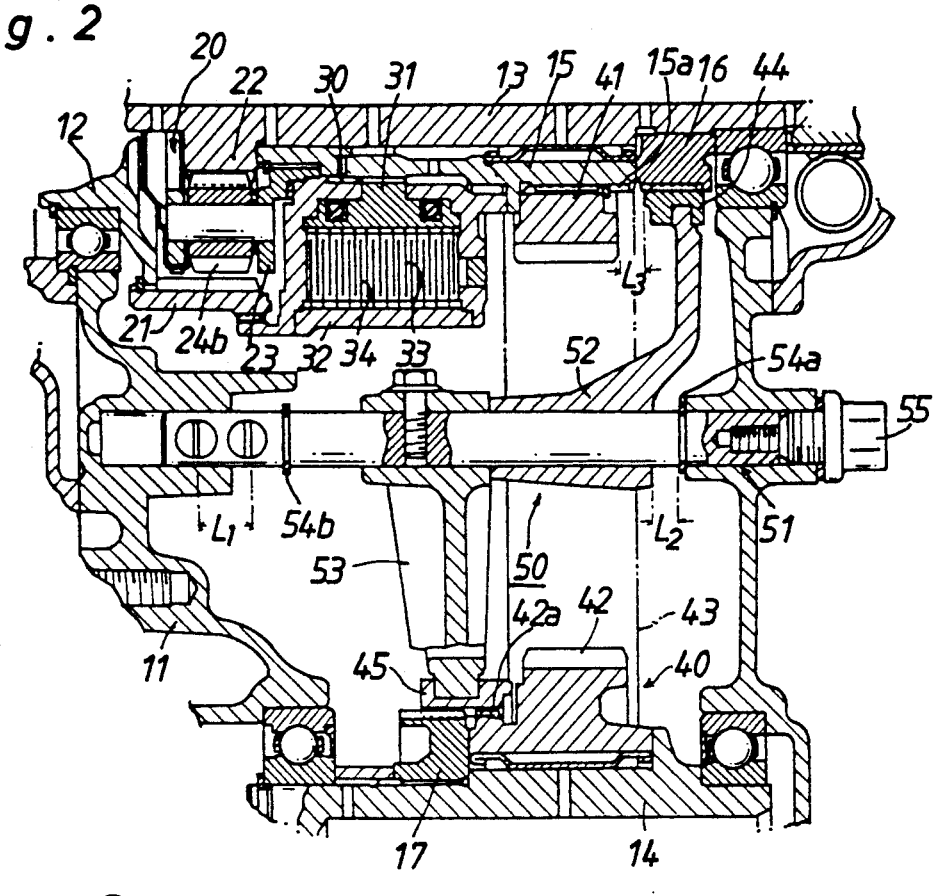
FIG. 2 is a partial sectional view on an enlarged scale showing details of a planetary gearset and a limited-slip differential in the power transfer mechanism.

In FIG. 1 of the drawings, there is illustrated a power transfer mechanism adapted for use in combination with a power transmission of a four-wheel drive vehicle. The power transfer mechanism includes a transfer casing structure 11 secured to a casing structure of the power transmission, an input shaft 12 for drive connection to an output shaft of the power transmission, a first output shaft 13 for drive connection to a set of rear-wheel drive axles (not shown), and a second output shaft 14 for drive connection to a set of front-wheel drive axles (not shown). The input shaft 12 is rotatably mounted on a left-hand side wall of casing structure 11 through a ball bearing and has an annular flange located in the interior of casing structure 11. The first output shaft 13 is arranged coaxially with the input shaft 12 and is rotatably mounted on a right-hand side wall of casing structure 11 through a ball bearing. The first output shaft 13 has an inner end coupled within the inner end of input shaft 12 through a needle bearing for relative rotation. The second output shaft 14 is arranged in parallel with the first output shaft 13 and is rotatably supported by a pair of axially spaced ball bearings mounted within the casing structure 11.

The power transfer mechanism further includes an intermediate hollow shaft 15 in surrounding relationship with the first output shaft 13 for relative rotation, a planetary or epicyclic gearset 20 arranged between the input and output shafts 12 and 13, a limited-slip differential 30 in the form of a viscous fluid coupling mounted on the intermediate hollow shaft 15, a chain drive train 40 for drive connection between the intermediate hollow shaft 15 and the second output shaft 14, and a shift mechanism 50 for selectively establishing a four-wheel drive mode or a two-wheel drive at the transfer mechanism.

The planetary gearset 20 is of the double pinion type which comprises a ring gear 21, a sun gear 22, a planet carrier 23 and a plurality of planet pinions 24a, 24b. The ring gear 21 is unitedly assembled with the annular flange of input shaft 12 for rotation therewith, and the sun gear 22 is integrally provided on the first output shaft 13 for rotation therewith. The planet pinions 24a and 24b are rotatably supported on the planet carrier 23 and meshed with one another in an annular space between the ring gear 21 and sun gear 22. The planet pinions 24a are in meshing engagement with the ring gear 21, while the pinions 24b are in meshing engagement with the sun gear 22. The ring gear 21 is coupled with an annular outer casing 32 of viscous fluid coupling 30 for rotation therewith, and the planet carrier 23 is mounted on the intermediate hollow shaft 15 for rotation therewith. The outer casing 32 of viscous fluid coupling 30 is rotatably supported on the intermediate hollow shaft 15.

The viscous fluid coupling 30 comprises an inner member 31 mounted on the intermediate hollow shaft 15 for rotation therewith and rotatably coupled within the outer casing 32 in a fluid-tight manner to form a sealed fluid chamber filled with an amount of viscous fluid such as silicone oil, a first set of annular plates 33 engaged at their inner peripheries with an externally splined portion of the inner member 31 for rotation therewith, and a second set of annular plates 34 engaged at their outer peripheries with an internally splined portion of the outer casing 32 for rotation therewith and being interleaved with the first set of annular plates 33.

The chain drive train 40 comprises a drive sprocket 41 mounted on the intermediate hollow shaft 15 for rotation therewith, and a driven sprocket 42 rotatably mounted on the second output shaft 14 and being drivingly connected to the drive sprocket 41 by means of a drive chain 43. An externally splined hub member 16 is arranged adjacent the rear end of hollow shaft 15 and mounted on the first output shaft 13 for rotation therewith. A first clutch sleeve 44 is splined to the hub member 16 to be selectively engaged with an externally splined portion 15a of hollow shaft 15. A second clutch sleeve 45 is splined to a hub member 17 fixed to the second output shaft 14 to be selectively engaged with an externally splined hub portion 42a of driven sprocket 42.

The shift mechanism 50 includes a shift rod 51 arranged between the output shafts 13, 14 in parallel therewith and mounted axially slidably within the casing structure 11. The shift rod 51 is provided thereon with a pair of axially spaced snap rings 54a, 54b which are brought into engagement with axially spaced inner end walls of the casing structure 11 to restrict axial movement of the shift rod 51 in a distance $L_1$ under cooperation with a detent mechanism (not shown). A first shift fork 52 is axially slidably mounted on the shift rod 51 at its base portion and coupled with the first clutch sleeve 44. A second shift fork 53 is fixed to the shift rod 51 at its base portion at a position adjacent the first shift fork 52 and coupled with the second clutch sleeve 45.

When the second shift fork 53 is positioned to maintain the second clutch sleeve 45 in engagement with the externally splined hub portion 42a of driven sprocket 42 for four-wheel drive, the first shift fork 52 is spaced from the right-hand snap ring 54a in a distance $L_2$ to disengage the first clutch sleeve 44 from the externally splined portion 15a of hollow shaft 15. In this instance, the first clutch sleeve 44 is spaced from the right end of hollow shaft 15 in a distance $L_3$. When the shift rod 51 is shifted leftwardly in the distance $L_1$, the first shift fork 52 is shifted in the distance $L_3$ by abutment with the right-hand snap ring 54aa after the second shift fork 53 has been shifted with the shift rod 51 in the distance $L_2$. As a result, the second clutch sleeve 45 is disengaged from the externally splined hub portion 42a of driven sprocket 42, while the first clutch sleeve 44 is engaged with the externally splined portion 51a of hollow shaft 15. From the above description, it will be understood that the distance $L_1$ is determined to be in a relationship of $L_1=L_2+L_3$.

In the planetary gearset 20, the ring gear 21 is adapted as an input element in drive connection to the input shaft 12, the sun gear 22 is adapted as a first output element in drive connection to the first output shaft 13, and the planet carrier 23 is adapted as a second output element in drive connection to the second output shaft 14. The planet carrier 23 is drivingly connected to the second output shaft 14 through the intermediate hollow shaft 15 and chain drive train 40 and is also drivingly connected to the inner member 31 of viscous fluid coupling 30 through the intermediate hollow shaft 15.

In operation, the ring gear 21 of planetary gearset 20 rotates with the input shaft 12 when applied with drive torque from the power transmission (not shown). In this instance, the ring gear 21 acts to rotate the planet carrier 23 and sun gear 22 through pinions 24a, 24b. As a result, the first output shaft 13 rotates with the sun gear 22 to transfer the drive torque to the rear-wheel drive axles, while the intermediate hollow shaft 15 rotates with the planet carrier 23 to transfer the drive torque to the drive sprocket 41. Assuming that the first shift fork 52 is positioned to disengage the first clutch sleeve 44 from the externally splined portion 15a of hollow shaft 15 and that the second shift fork 53 is positioned to maintain the second clutch sleeve 45 in engagement with the externally splined hub portion 42a of driven sprocket 42, the drive torque from planet carrier 23 is transmitted to the second output shaft 14 to establish a four-wheel drive mode of the vehicle. During travel of the vehicle in the four-wheel drive mode, the planetary gearset 20 acts to permit differential action between the front and rear wheel drive axles for preventing the occurrence of tight-corner braking phenomena, and the viscous fluid coupling 30 acts to limit the differential action between the output shafts 13 and 14 for increasing traction of the vehicle on rough roads.

When the shift rod 51 is shifted to the left in the distance $L_1$, the second shift fork 53 is shifted with the shift rod 51 to disengage the second clutch sleeve 45 from the driven sprocket 42. When the shift rod 51 has been shifted to the left in the distance $L_2$, the first shift fork 52 is brought into abutment with the right-hand snap ring 54a and shifted with the shift rod 51 in the distance $L_3$ to engage the first clutch sleeve 44 with the externally splined portion 15a of hollow shaft 15. Thus, the intermediate hollow shaft 15 rotates with the first output shaft 13, while the driven sprocket 42 becomes free to rotate on the second output shaft 14 to establish a two-wheel drive mode. In this instance, the drive torque from ring gear 1 is transmitted only to the first output shaft 13 in a condition where the planetary gearset 20 and viscous fluid coupling 30 are inoperative.

When the shift rod 51 is returned to the right in the distance $L_1$, the second shift fork 53 is shifted with the shift rod 51 to bring the second clutch sleeve 45 into engagement with the externally splined hub portion 42a of driven sprocket 42, while the first shift fork 52 is shifted rightwardly by abutment with the second shift fork 53 in the distance $L_3$ after the second shift fork 53 has been shifted in the distance $L_2$ to disengage the first clutch sleeve 44 from the externally splined portion 15a of hollow shaft 15 for establishing the four-wheel drive mode. As described above, the first and second clutch sleeves 44, 45 are simultaneously shifted in the predetermined different distances.

Figure 3:
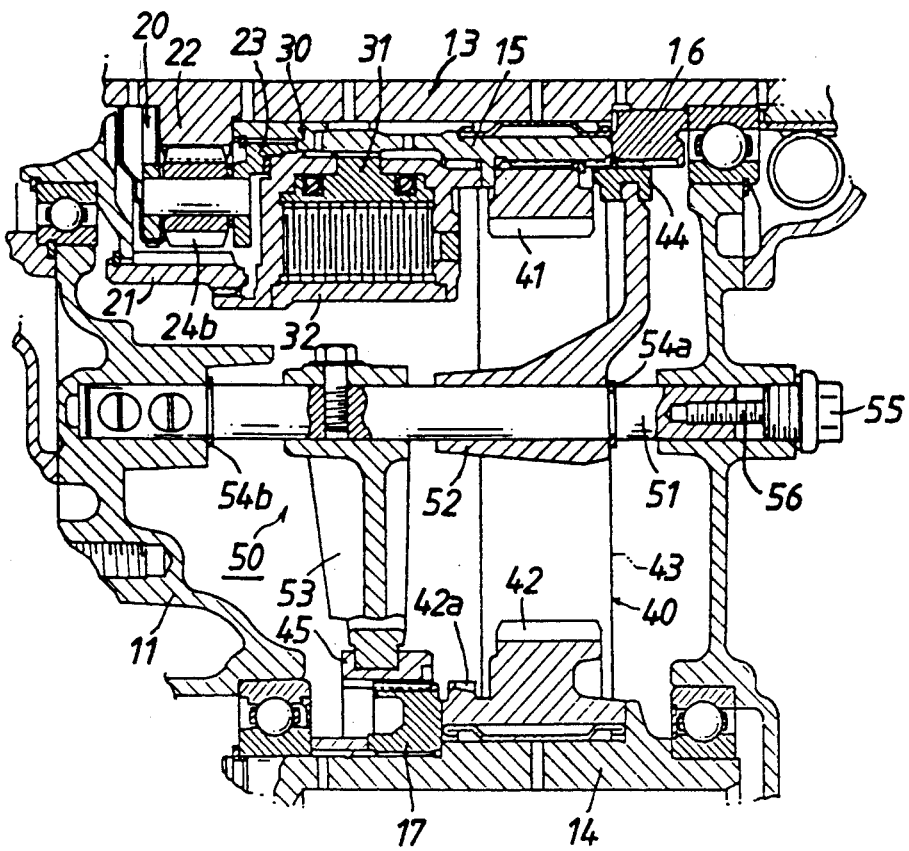
FIG. 3 is a partial sectional view on an enlarged scale showing details of a modification of the power transfer mechanism.

In the shift mechanism 50, a plug 55 is threaded into the righ-hand wall of casing structure 11 to define the rightward stroke end of shift rod 51 by abutment therewith. When it is desired to provide a full-time two-wheel drive mode, as shown in FIG. 3, a screw rod 56 is threaded into the right end of shift rod 51 and is engaged with the inner end of plug 55 to retain the shift rod 51 at a position shifted to the left in the distance $L_1$. In such a case, the first shift fork 52 is retained to maintain the first clutch sleeve 44 in engagement with the externally splined portion 15a of hollow shaft 15, while the second shift fork 53 is retained to disengage the second clutch sleeve 45 from the hub portion of driven sprocket 42. Alternatively, the plug 55 may be replaced with an actuator for selectively shifting the shift rod 51.

In the power transfer mechanism, it is to be noted that the limited-slip differential in the form of viscous fluid coupling 30 is disposed between the ring gear 21 and planet carrier 23 of planetary gearset 20. With such an arrangement, the half of differential rotation between the front and rear wheel drive axles acts on the viscous fluid coupling 30 to cause relative rotation between the interleaved annular plates 33 and 34. This is effective to avoid excessive wear of the components of viscous fluid coupling 30. Since the sun gear 22 is adapted as the output element in drive connection to the first output shaft 13 and the planet carrier 23 as the output element in drive connection to the second output shaft 14, the transfer ratio of drive torque to the rear-wheel drive axles can be determined to be larger than that of drive torque to the front-wheel drive axles.

It should be understood that while a preferred embodiment of the invention has been shown and described, this is illustrative and may be modified by those skilled in the art without departing from the scope of the appended claims defined herein.

What is claimed is:

1. A power transfer mechanism adapted for use in a motor vehicle, comprising:
   a casing structure;
   an input shaft rotatably mounted within said casing structure to be applied with drive torque from a prime mover of the vehicle;
   a first output shaft arranged coaxially with said input shaft and rotatably mounted within said casing structure for drive connection to a first set of drive axles;
   a second output shaft arranged in parallel with said first output shaft and rotatably mounted within said casing structure for drive connection to a second set of drive axles;
   a double pinion planetary gearset mounted on said first output shaft to transfer the drive torque from said input shaft to said first and second output shafts, said planetary gearset including a ring gear in drive connection to said input shaft, a sun gear in drive connection to said first output shaft and a planet carrier for drive connection to said second output shaft;
   a limited-slip differential selectively connecting the ring gear and planet carrier of said planetary gearset; and
   a drive train for providing drive connection between said planet carrier and said second output shaft.

2. A power transfer mechanism as claimed in claim 1, wherein said planet carrier is mounted on an intermediate hollow shaft in surrounding relationship with said first output shaft for rotation therewith, and said limited-slip differential is in the form of a viscous fluid coupling mounted on said intermediate hollow shaft, said fluid coupling including an outer casing coupled with the ring gear of said planetary gearset for rotation therewith, an inner member mounted on said intermediate hollow shaft and coupled within said outer casing for relative rotation, a first set of annular plates axially slidably coupled with said inner member for rotation therewith, and a second set of annular plates axially slidably coupled within said outer casing for rotation therewith and being interleaved with said first set of annular plates.

3. A power transfer mechanism as claimed in claim 2, wherein said drive train for drive connection between said planet carrier and said second output shaft includes a drive member mounted on said intermediate hollow shaft at a rear side of said viscous fluid coupling for rotation therewith, a driven member rotatably mounted on said second output shaft in a common vertical plane with said drive member to be selectively connected to said second output shaft and being drivingly connected to said drive member.

4. A power transfer mechanism as claimed in claim 3, wherein a first clutch sleeve is mounted on said first output shaft and shiftable between a first position in which said first clutch sleeve is retained to disconnect said intermediate hollow shaft from said first output shaft and a second position in which said first clutch sleeve is retained to connect said intermediate hollow shaft to said first output shaft, and wherein a second clutch sleeve is mounted on said second output shaft and shiftable between a first position in which said second clutch sleeve is retained to connect said driven member to said second output shaft and a second position in which said second clutch sleeve is retained to disconnect said driven member from said second output shaft.

5. A power transfer mechanism as claimed in claim 3, wherein said first output shaft is arranged for drive connection to a set of rear-wheel drive axles, while said second output shaft is arranged for drive connection to a set of front-wheel drive axles.

6. A power transfer mechanism as claimed in claim 4, further comprising means for positioning said first clutch sleeve in the second position and for positioning said second clutch sleeve in the second position.

* * * * *